United States Patent
Kim et al.

(10) Patent No.: US 9,292,191 B2
(45) Date of Patent: Mar. 22, 2016

(54) APPARATUS AND METHOD FOR DETERMINING USER INPUT PATTERN IN PORTABLE TERMINAL

(75) Inventors: Hyoung-Il Kim, Gyeonggi-do (KR); Hyun-Woo Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 821 days.

(21) Appl. No.: 12/879,438

(22) Filed: Sep. 10, 2010

(65) Prior Publication Data

US 2011/0057907 A1 Mar. 10, 2011

(30) Foreign Application Priority Data

Sep. 10, 2009 (KR) .......... 10-2009-0085243

(51) Int. Cl.
| | |
|---|---|
| G06F 3/0488 | (2013.01) |
| G06F 3/042 | (2006.01) |
| G06F 3/0481 | (2013.01) |
| G06F 3/0482 | (2013.01) |

(52) U.S. Cl.
CPC .............. G06F 3/0488 (2013.01); G06F 3/042 (2013.01); G06F 3/0482 (2013.01); G06F 3/04817 (2013.01)

(58) Field of Classification Search
CPC .............. G06F 3/042–3/0423; G06F 3/0488; G06F 3/04817; G06F 3/0482
USPC .................................................. 345/156–184
See application file for complete search history.

(56) References Cited

U.S. PATENT DOCUMENTS

| | | | | |
|---|---|---|---|---|
| 2007/0262965 | A1* | 11/2007 | Hirai et al. ..................... | 345/173 |
| 2008/0158144 | A1* | 7/2008 | Schobben et al. ............. | 345/156 |
| 2008/0320391 | A1* | 12/2008 | Lemay et al. .................. | 715/702 |
| 2009/0160792 | A1* | 6/2009 | Morohoshi et al. ........... | 345/173 |
| 2009/0219246 | A1* | 9/2009 | Suzuki ........................... | 345/156 |
| 2010/0041431 | A1* | 2/2010 | Kim et al. .................. | 455/550.1 |
| 2010/0041470 | A1* | 2/2010 | Preisach .......................... | 463/25 |
| 2010/0079405 | A1* | 4/2010 | Bernstein ....................... | 345/174 |
| 2010/0201812 | A1* | 8/2010 | McGibney et al. ............ | 348/143 |

FOREIGN PATENT DOCUMENTS

| | | |
|---|---|---|
| JP | 2009-163278 | 7/2009 |
| KR | 1020060119527 | 11/2006 |
| KR | 1020080068384 | 7/2008 |
| KR | 1020090041784 | 4/2009 |

OTHER PUBLICATIONS

Beattie, Russell; iPhone text entry thoughts; Dec. 9, 2007; Blog: www.russellbeattie.com/blog/iphone-text-entry-thoughts.*

(Continued)

*Primary Examiner* — Larry Sternbane
(74) *Attorney, Agent, or Firm* — The Farrell Law Firm, P.C.

(57) ABSTRACT

An apparatus and method for determining a user input pattern in a portable terminal. The apparatus includes a sensing unit, a pattern management unit, and an output management unit. The sensing unit includes a sensor for sensing light, and measuring a sensed value for light. The pattern management unit determines an input pattern of a user based on a measured value of the sensing unit. The output management unit performs an operation corresponding to the input pattern determined by the pattern management unit.

14 Claims, 14 Drawing Sheets

(56) References Cited

OTHER PUBLICATIONS

Beattie, Russell; iPhone text entry thoughts; Dec. 6, 2007; Blog: www.russellbeattie.com/blog/iphone-text-entry-thoughts.*

Korean Office Action dated Nov. 2, 2015 issued in counterpart application No. 10-2009-0085243, 10 pages.
Korean Office Action dated Jan. 13, 2016 issued in counterpart application No. 10-2009-0085243, 6 pages.

* cited by examiner

APPARATUS AND METHOD FOR DETERMINING USER INPUT PATTERN IN PORTABLE TERMINAL

PRIORITY

This application claims priority under 35 U.S.C. §119 to an application filed in the Korean Intellectual Property Office on Sep. 10, 2009 and assigned Serial No. 10-2009-0085243, the content of which is incorporated herein by reference.

BACKGROUND OF THE INVENTION

1. Field of the Invention

The present invention relates generally to an apparatus and method for determining a user input pattern in a portable terminal, and in particular, to an apparatus and method for determining a user input pattern, which fluidly changes the position of a Graphical User Interface (GUI) based on the touch input pattern of the user in a portable terminal.

2. Description of the Related Art

In an effort to attract more customers, service providers and portable terminal manufacturers are competitively developing the portable terminals that provide more convenient functions. For example, it is common for a portable terminal to provide functions such as a phone book, a game, a scheduler, a short message service, a multimedia message service, a broadcasting message service, an Internet service, e-mail, a wake-up call function, an MP3 function, a digital camera, etc.

Additionally, portable terminals using touch screen type have been developed, which input data using a user hand or a stylus pen, thereby enabling a user to enter commands, write text, and draw a line in a portable terminal.

More specifically, a touch screen portable terminal senses pressure applied by a user and determines a touch input corresponding to a position of the sensed pressure. However, this type of method merely replaces a conventional button input and cannot sense, for example, a rotation of a finger after touching the screen.

Additionally, in portable terminals, a plurality of Graphical User Interfaces (GUIs) are arranged in a display unit and perform a function corresponding to a user selection. Because the positions of the GUIs are statically arranged, it is difficult for a user to select a corresponding GUI with the same hand that is holding the portable terminal. That is, it is often difficult for a user to select all the GUIs with the thumb of their hand that is holding the portable terminal.

Also, when a user selects a GUI, the user must cover a display region being selected by a finger, thereby blocking an area of the display. Therefore, it is inconvenient for the user of the portable terminal to detect a GUI in the blocked area. For example, an icon on a screen may be covered by a user's finger performing an input, and consequently, the user should inconveniently take the finger off the screen, and determine and select the covered icon for selecting it.

SUMMARY OF THE INVENTION

The present invention is designed to substantially solve at least the above-described problems and/or disadvantages and to provide at least the advantages described below. Accordingly, an aspect of the present invention is to provide an apparatus and method for determining a user input pattern in a portable terminal.

Another aspect of the present invention is to provide an apparatus and method for determining a user input pattern, by determining the position and direction of a user's finger using a light receiving sensor in a portable terminal.

Another aspect of the present invention is to provide an apparatus and method for determining a user input pattern, by determining a touch input pattern of a user and rearrange icons of a blocked region into a visible region in a portable terminal.

In accordance with an aspect of the present invention, an apparatus for determining a user input pattern in a portable terminal is provided. The apparatus includes a sensing unit including a sensor for sensing light, and measuring a sensed value for light; a pattern management unit for determining an input pattern of a user with a measured value of the sensing unit; and an output management unit for processing an operation corresponding to the input pattern determined by the pattern management unit.

In accordance with another aspect of the present invention, a control apparatus of portable terminal that determines an input pattern of a user is provided. The control apparatus includes a control unit for determining at least one input pattern among an operation that inputs different characters on a same key, an operation that rearranges a Graphical User Interface (GUI) of a blocked region into a visible region, and an operation that resets the GUI within a finger moving range of the user, and for performing an operation corresponding to the determined input pattern.

In accordance with another aspect of the present invention, a method for determining an input pattern of a user in a portable terminal is provided. The method includes measuring a value of sensed light via a sensor, determining an input pattern of a user corresponding to the measured value of the sensor, and performing an operation corresponding to the determined input pattern.

In accordance with another aspect of the present invention, a control method of portable terminal that determines an input pattern of a user is provided. The method includes determining at least one input pattern among an operation that inputs different characters on a same key, an operation that rearranges a Graphical User Interface (GUI) of a blocked region into a visible region, and an operation that resets the GUI within a finger moving range of the user; and processing an operation corresponding to the determined input pattern.

BRIEF DESCRIPTION OF THE DRAWINGS

The above and other aspects, features, and advantages of certain embodiments the present invention will become more apparent from the following detailed description when taken in conjunction with the accompanying drawings in which.

DETAILED DESCRIPTION OF EMBODIMENTS OF THE INVENTION

The following description, with reference to the accompanying drawings, is provided to assist in a comprehensive understanding of certain embodiments of the present invention as defined by the claims and their equivalents. It includes various specific details to assist in that understanding, although these are to be regarded as merely exemplary. Accordingly, a person having ordinary skill in the art will recognize that various changes and modifications of the embodiments described herein can be made without departing from the scope and spirit of the present invention. Also, descriptions of well-known functions and constructions are omitted for clarity and conciseness.

Further the terms and words used in the following description and claims are not limited to the dictionary meanings, but are merely used by the inventor to enable a clear and consistent understanding of the present invention.

Figure 1:
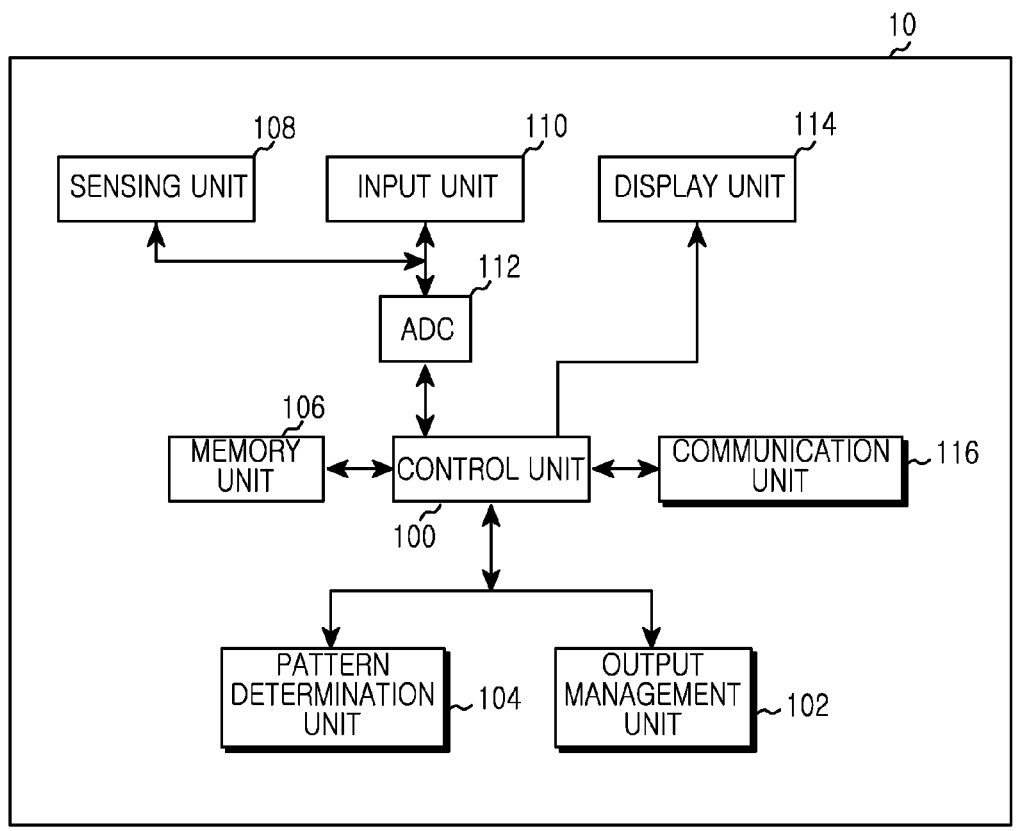
FIG. 1 is a block diagram illustrating a portable terminal that determines a touch input pattern of a user, according to an embodiment of the present invention.

FIG. 1 is a block diagram illustrating a portable terminal that determines a touch input pattern of a user, according to an embodiment of the present invention.

Referring to FIG. 1, a portable terminal 10 includes a control unit 100, an output management unit 102, a pattern determination unit 104, a memory unit 106, a sensing unit 108, an input unit 110, an Analog-to-Digital Converter (ADC) 112, a display unit 114, and a communication unit 116. The portable terminal may also include additional units. Similarly, as an alternative construction, the functionality of two or more of the above units may be integrated into a single component.

The control unit 100 controls the overall operation of the portable terminal. For example, the control unit 100 controls voice telephone conversation and data communication. In addition to common functions, the control unit 100 also determines a finger position and direction of a user input using a value that is measured by the sensing unit 108 to determine the input pattern of the user, and thereafter, controls an operation of the portable terminal corresponding to the input pattern of the user.

For example, the control unit 100 determines the input pattern of the user, and controls different operations on one key input button. The control unit 100 determines a blocked region that may be covered by the finger of the user and rearranges the icon from the blocked region into a visible region according to the input pattern of the user.

The control unit 100 may perform control for the pattern determination unit 104 to determine the input pattern of the user, and may perform control for the output management unit 102 to rearrange the icon from the blocked region into the visible region.

The output management unit 102 changes a position of a GUI based on the input pattern of the user that is received from the control unit 100. The output management unit 102 moves the icon from the blocked region to the visible region or outputs different character data on a key input button.

The pattern determination unit 104 determines the input pattern of the user using a value that is measured by the sensing unit 108 according to the control of the control unit 100. For example, when a measured value on a region not sensing light is received, the pattern determination unit 104 determines the finger of the user as being disposed in a corresponding region and thus determines whether the user performs a touch input with the left hand or the right hand. Also, the pattern determination unit 104 may determine the position and rotation direction of the finger of the user using the measured value.

The memory unit 106 includes, for example, a Read-Only Memory (ROM), a Random Access Memory (RAM), a flash ROM, etc. The ROM stores all kinds of reference data and microcode of program, and the RAM is a working memory of the control unit 100, which stores temporary data generated during programming. The flash ROM stores updatable data for management such as sent calls, sent messages, received messages, etc.

The sensing unit 108 may include a plurality of light receiving sensors for sensing light, and transfers the measured values of the sensors to the ADC 112. The ADC 112 converts the measured value provided from the sensing unit 108 into a digital value to transfer the digital value to the control unit 100, thereby enabling the control unit 100 to determine the input pattern.

The input unit 110 includes a plurality of function keys such as numerical buttons, a menu button, a cancel button, an OK button, a talk button, an end button, an Internet access button, navigation key buttons, a character input key, etc. The input unit 110 provides a key input data corresponding to a key pushed by the user to the control unit 100. These keys are merely examples of keys which may make up the input unit 110. That is, the input unit may include additional or different keys, or different input mechanisms through which the user supplies input to the portable terminal.

The display unit 114 displays state information, characters of limited numerals, a plurality of moving images and a plurality of still images that are generated during the operation of the portable terminal. The display unit 114 may use a color Liquid Crystal Display (LCD), an Active Mode Organic Light Emitting Diode (AMOLED), etc. The display unit 114 also includes a touch input device used as an input unit.

The communication unit 116 transmits and receives wireless signal data that is input and output through an antenna (not illustrated). For example, for transmission, the communication unit 116 performs channel coding and spreading on data to transmit, and performs Radio Frequency (RF) processing to transmit an RF signal. For reception, the communication unit 116 converts a received RF signal into a baseband signal, and performs dispreading and channel decoding on the baseband signal to restore data.

The control unit 100 may perform the functions of the output management unit 102 and the function of the pattern determination unit 104, but for convenience of the explanation herein, the output management unit 102 and the pattern determination unit 104 are implemented and illustrated separately. For example, the control unit 100 may include the output management unit 102 and the pattern determination unit 104.

Figure 2:
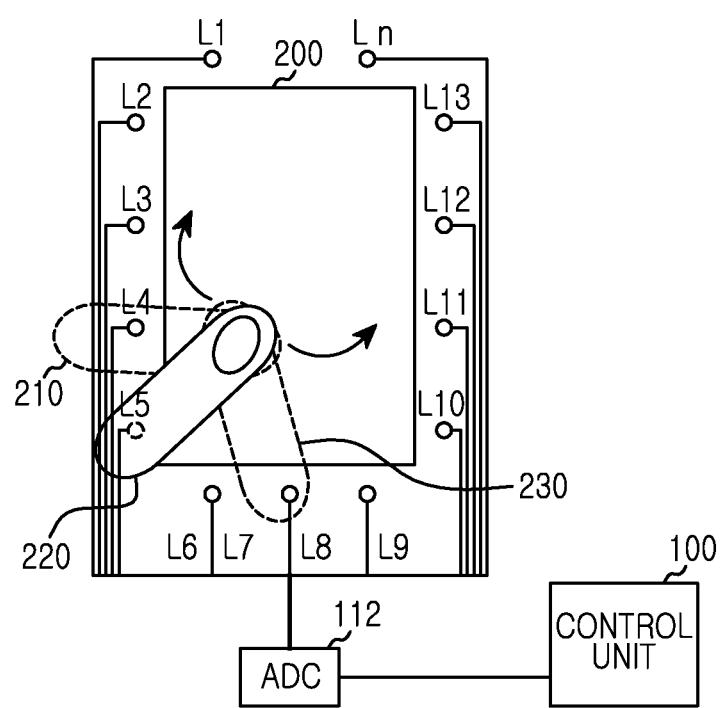
FIG. 2 is a diagram illustrating a sensing unit for sensing a touch input pattern of a user in a portable terminal according to an embodiment of the present invention.

FIG. 2 is a diagram illustrating a sensing unit for sensing a touch input pattern of a user in a portable terminal according to an embodiment of the present invention.

Referring to FIG. 2, the portable terminal includes a plurality of light receiving sensors L1 to Ln for sensing light, wherein the light receiving sensors are disposed around a display screen 200. When the finger of the user is on the display screen, a portion of the screen is covered by the finger, and the measured value of a light receiving sensor disposed in the covered portion differs from the measured value of a light receiving sensor disposed in an uncovered portion. When the current position of a finger 220 of the user moves to a position 210 or a position 230, the light receiving sensor of a corresponding direction is covered by the finger 220, and a light receiving sensor covered in the previous position of the finger may again receive light. Accordingly, the portable terminal determines the input pattern of the user by using the changed measured values of the light receiving sensors. For example, the portable terminal determines whether a touch is made by a finger of the left hand or a finger of the right hand. When the touch is made by a finger of the left hand, light is blocked too much to the left and when the touch is made by a finger of the right hand, light is blocked too much to the right.

As described above, the measured value of the light receiving sensor is converted into a digital value by the ADC 112 and is transferred to the control unit 100.

Figure 3:
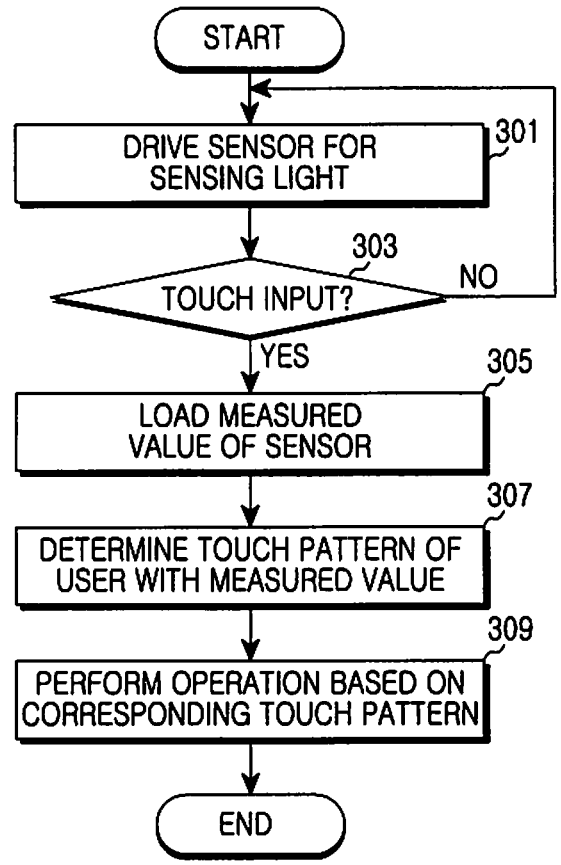
FIG. 3 is a flowchart illustrating a method for processing a touch input of a user in a portable terminal according to an embodiment of the present invention.

FIG. 3 is a flowchart illustrating a method for processing a touch input of a user in a portable terminal according to an embodiment of the present invention.

Referring to FIG. 3, the portable terminal first drives the light receiving sensors that may sense light like photo sensitive diodes and photo sensitive transistors in step 301. Herein, as a terminal capable of touch input, the portable terminal may include a plurality of light receiving sensors around a region (touch screen panel) for performing the touch input and determine the input pattern (for example, left-hand input or right-hand input) of a user.

Subsequently, the portable terminal proceeds to step 303 and determines whether a touch input is performed by the user. At this point, the portable terminal may determine whether the touch input of the user is generated using the measured value of the light receiving sensor. For example, when the user of the portable terminal disposes a finger or a stylus pen on the light receiving sensor while performing a touch input, a light receiving sensor in a corresponding position cannot sense light and thus the portable terminal may determine that a touch input is generated. When all the light receiving sensors sense light, the portable terminal may determine that a touch input is not generated.

If it is determined in step 303 that the touch input is not being generated, the portable terminal again performs step 301.

If it is determined in step 303 that the touch input is being generated, the portable terminal loads the measured value of the light receiving sensor in step 305 and. Subsequently, the portable terminal determines the touch input pattern of the user with the measured value loaded in step 307. The portable terminal may determine whether the user performs the touch input pattern with the left hand or the right hand by using the position of a light receiving sensor not sensing light or the measured value of a light receiving sensor of sensing light.

In step 309, the portable terminal performs an operation corresponding to the determined touch input pattern of the user. For example, the portable terminal may perform processing in order to move the position of a scroll key for the moving of a screen or change the position of an icon that may be covered according to the position of a finger, based on the touch input pattern of the user.

Figure 4:
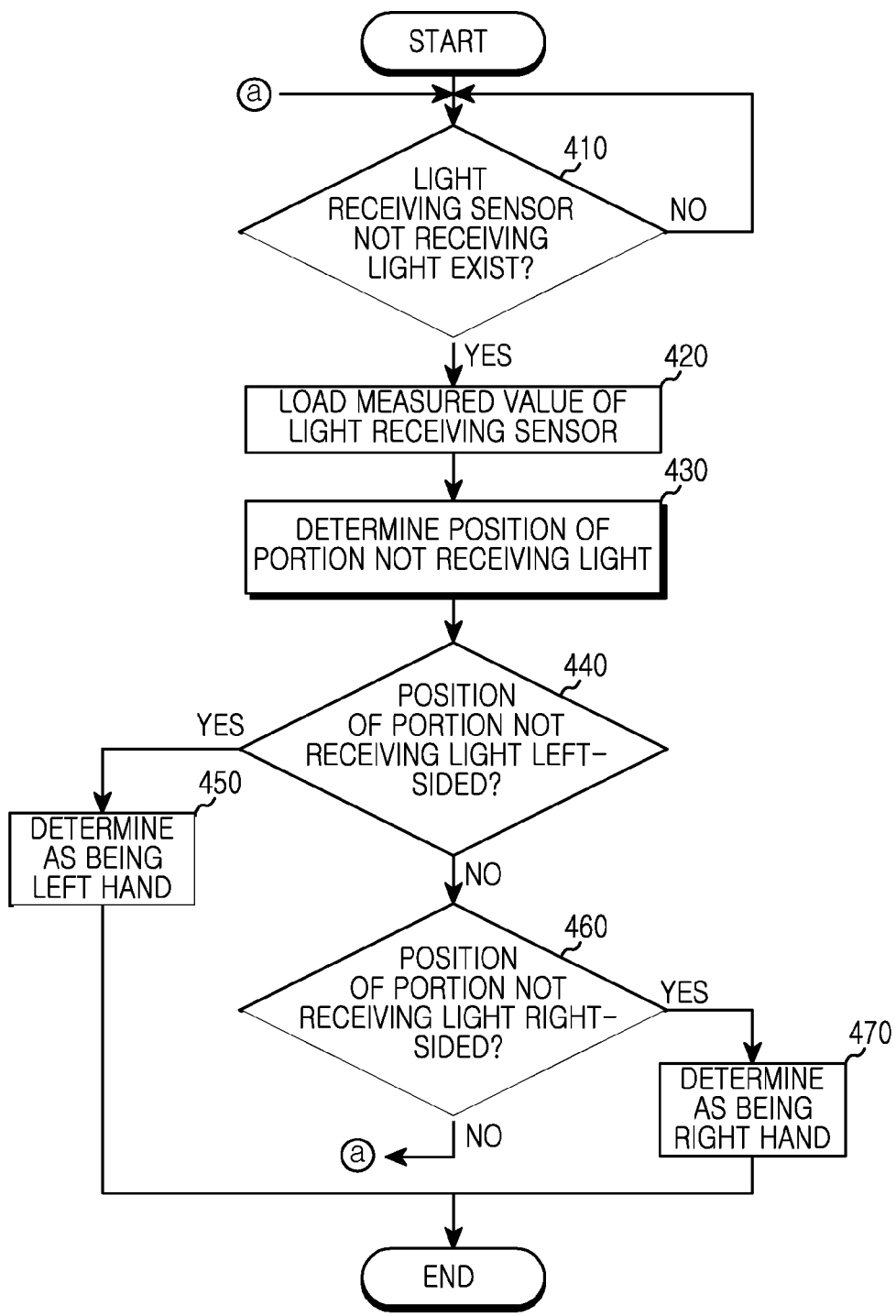
FIG. 4 is a flowchart illustrating a method for determining an input pattern of a user in a portable terminal according to an embodiment of the present invention.

FIG. 4 is a flowchart illustrating a method of determining an input pattern of a user in a portable terminal according to an embodiment of the present invention.

Referring to FIG. 4, as described above, the portable terminal is capable of touch input, and includes a plurality of light receiving sensors around a region for performing the touch input, i.e., the touch screen input.

The portable terminal determines whether there is a light receiving sensor among the light receiving sensors that stops sensing light in step 410. Specifically, as the light receiving sensors sense light, when a finger of the user is on a display screen, a portion of the screen may be covered by the finger and the light receiving sensor of the covered portion cannot sense the light. Therefore, the portable terminal may determine the touch input pattern of the user by using a measured value in a portion where the light receiving sensor is covered differs from a measured value in a portion where the light receiving sensor is not covered.

If it is determined in step 410 that there is no light receiving sensor not receiving light, the portable terminal continues to perform step 410.

If it is determined in step 410 that there is a light receiving sensor that is not receiving light, the portable terminal loads the measured value of the light receiving sensor in step 420, and determines the position not sensing light in step 430.

The portable terminal determines whether the position not receiving light is the left-side of the touch screen input, in step 440. When the position not receiving light is the left-side, the portable terminal determines that a pattern is input with the left hand in step 450. However, when the position not receiving light is not the left-side, the portable terminal determines whether the position not receiving light is on the right-side in step 460.

If it is determined in step 460 that the position not receiving light is on the right-side, the portable terminal determines the input pattern as being input with the right hand in step 470.

If it is determined in step 460 that the position not receiving light is not the right-side, the portable terminal returns to step 410.

Figure 5:
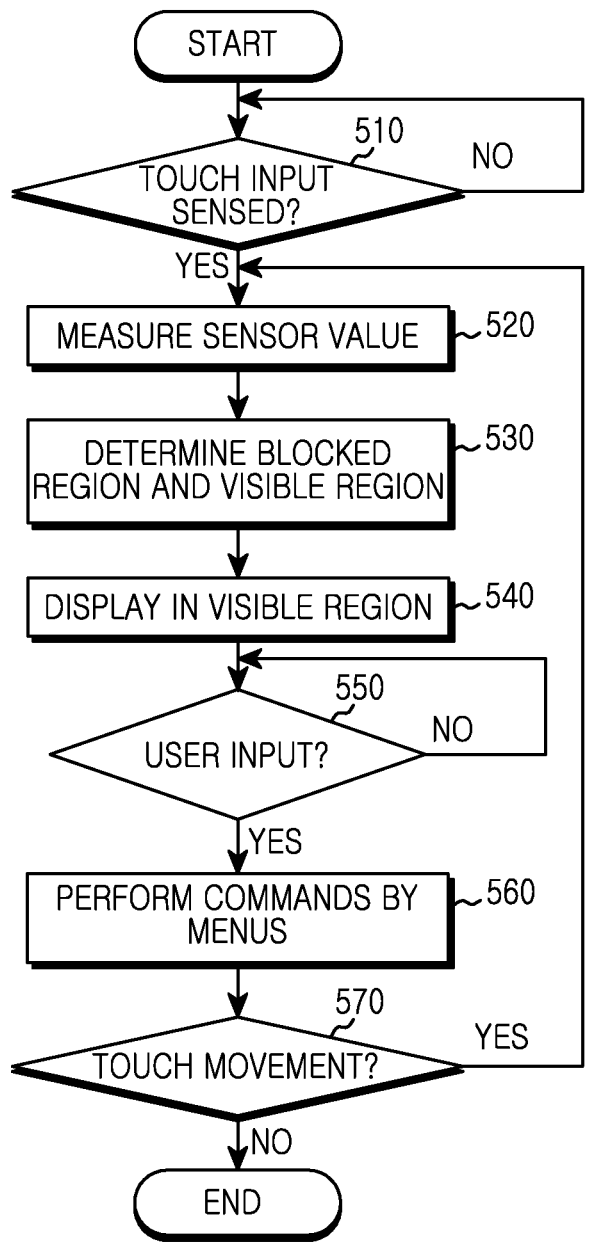
FIG. 5 is a flowchart illustrating a data output operation based on a touch input of a user in a portable terminal according to an embodiment of the present invention.

FIG. 5 is a flowchart illustrating a data output operation based on a touch input of a user in a portable terminal according to an embodiment of the present invention.

Referring to FIG. 5, the portable terminal determines whether a touch input of a user is sensed in step 510.

When it is determined that the touch input is sensed, the portable terminal measures a sensed value of light sensed through a light receiving sensor in step 520, and determines a visible region and a blocked region in step 530. Herein, the portable terminal determines whether the touch is made by the left hand or right hand of the user through the light receiving sensor, and determines the visible region and the blocked region that is covered by a finger or a stylus pen, based on a corresponding pattern.

The portable terminal outputs a GUI, such as a menu select icon, to the visible region in step 540, and determines whether a user input at the GUI is sensed in step 550.

When it is determined in step 550 that user input is sensed at the GUI, the portable terminal performs a command corresponding to the GUI selected by the user in step 560, and determines whether to sense touch movement in step 570.

If it is determined that the touch movement is sensed in step 570, the portable terminal returns to step 520 and repeatedly performs the above-described operation.

If it is determined that the touch movement is not sensed in step 570, the portable terminal ends the procedure.

Figure 6:
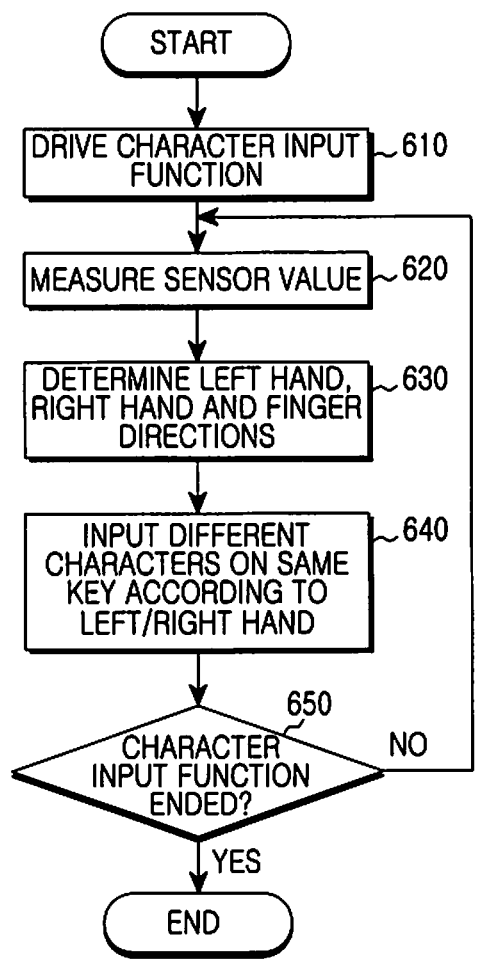
FIG. 6 is a flowchart illustrating a method for processing a character input based on a touch input of a user in a portable terminal according to an embodiment of the present invention.

FIG. 6 is a flowchart illustrating a method for processing a character input based on a touch input of a user in a portable terminal according to an embodiment of the present invention.

Referring to FIG. 6, the portable terminal enables the input of two characters through one character input button. For example, when entering Korean characters, a basic consonant is marked on the left of one character input button and a complex consonant is marked on the right of the one character input button, and thus the user may select the basic consonant or the complex consonant based on an input pattern.

In step 610, the portable terminal drives a character input function, and measures the sensed value of a light receiving sensor that senses the touch input of the user in step 620.

In step 630, the portable terminal determines the touch input pattern of the user such as a left-hand direction, a right-hand direction, and a finger direction, and performs a character input based on the determined pattern of the user in step 640. For example, when the user selects a button where a basic consonant 'ㄱ' is marked on the left of the button and a complex consonant 'ㄲ' is marked on the right of the button, the portable terminal allows 'ㄱ' to be input, when a left-handed touch input pattern of the user is determined, or the portable terminal allows 'ㄲ' to be input when a right-handed touch input pattern of the user is determined.

In step 650, the portable terminal determines whether a character input function is ended.

If it is determined that the character input function is not ended in step 650, the procedure returns to step 620, and portable terminal repeatedly performs steps 620-650.

If it is determined that the character input function has ended in step 650, the procedure ends.

Figure 7:
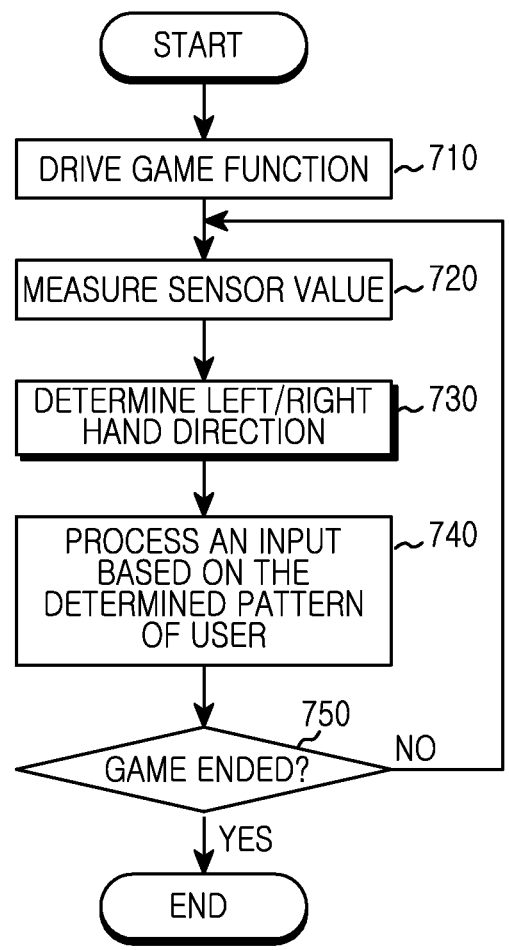
FIG. 7 is a flowchart illustrating a method for performing a game function based on a touch input of a user in a portable terminal according to an embodiment of the present invention.

FIG. 7 is a flowchart illustrating a method for performing a game function based on a touch input of a user in a portable terminal according to an embodiment of the present invention.

Referring to FIG. 7, the portable terminal drives a game function in step 710, and measures a sensed value of a light receiving sensor that senses the touch input of the user, in step 720.

In step 730, the portable terminal determines the touch input pattern of the user such as a left-hand direction, a right-hand direction, and a finger direction, and processes an input based on the determined pattern of the user in step 740. For example, the portable terminal moves a game character to the left when the left-hand touch input pattern of the user is determined, or moves the game character to the right when the right-hand touch input pattern of the user is determined.

The portable terminal continuously performs this method until it determines the game function is ended in step 750.

Figure 8:
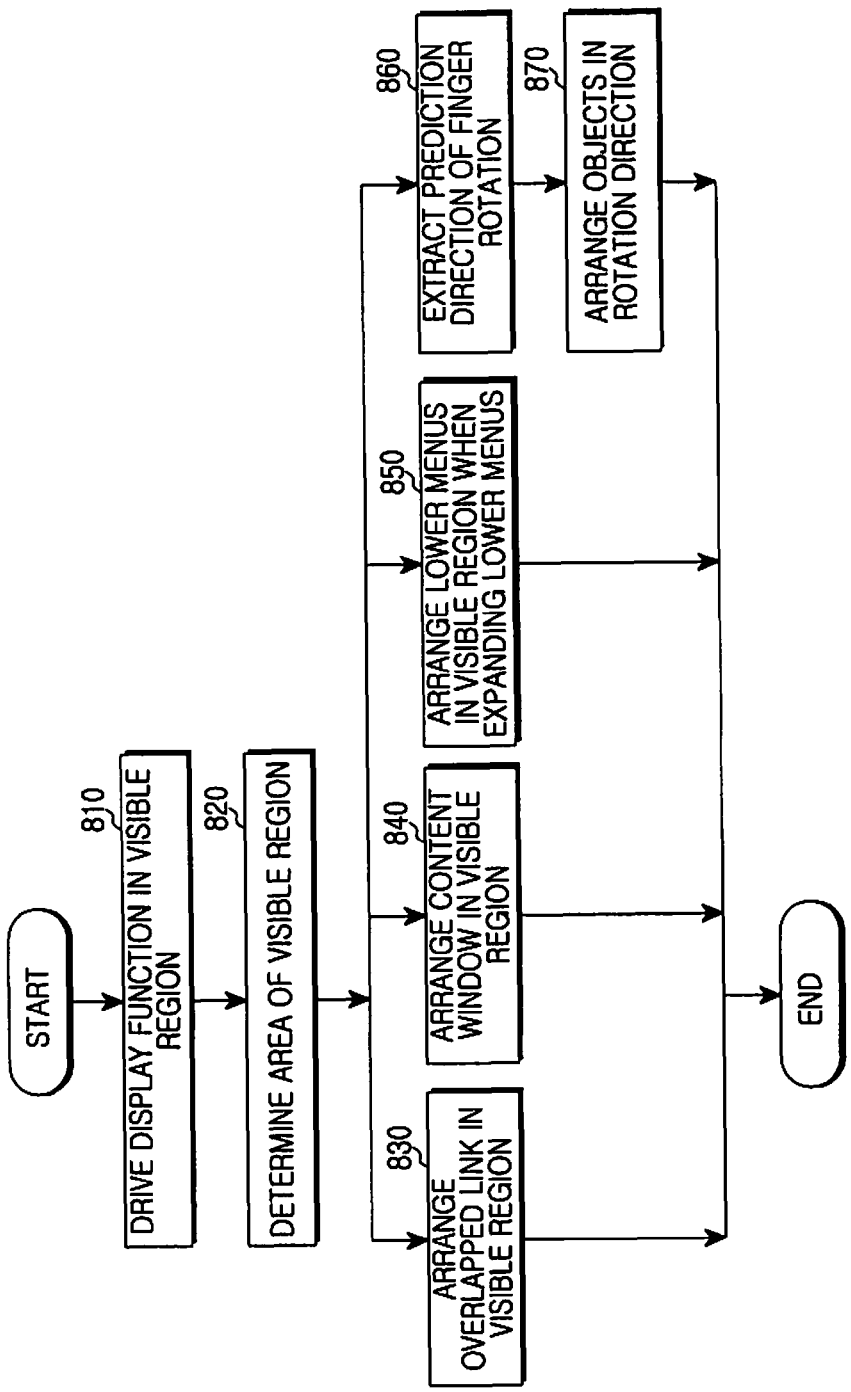
FIG. 8 is a flowchart illustrating a data output operation based on an input pattern of a user in a portable terminal according to an embodiment of the present invention.

FIG. 8 is a flowchart illustrating a data output operation based on an input pattern of a user in a portable terminal according to an embodiment of the present invention.

Referring to FIG. 8, the portable terminal drives a visible region display function in step 810, and determines the area of the visible region in step 820. Herein, as described above, the portable terminal determines the touch input pattern (for example, a touch input through the right hand or a touch input through the left hand) of the user through the light receiving sensor, and determines the visible region and the blocked region that may be covered by the finger or a stylus pen, based on a corresponding pattern.

The portable terminal outputs a link address overlapped in the blocked region to the visible region, outputs a content window such as the help of a point corresponding to the touch input of the user to the visible region, or outputs a lower menu by the menu selection of the user to the visible region.

When the portable terminal intends to output the link address overlapped in the blocked region to the visible region, the portable terminal determines an overlapped link that may be included in the blocked region, and floats a link corresponding to the blocked region in the visible region in step 830.

Further, when the portable terminal intends to output a content window using a point corresponding to the touch input of the user to the visible region, the portable terminal arranges a content window, including information on a point which corresponds to the touch input of the user, in a visible region that does not include the blocked region in step 840.

In step 850, when the portable terminal intends to output a lower menu by the menu selection of the user to the visible region, the portable terminal outputs lower menus, which may be output according to already-output menu selection, to a visible region outside the blocked region.

In addition, when the portable terminal determines the predicted direction of finger rotation and intends to move an output object according to the input pattern of the user, the portable terminal predicts a rotation direction based on a touch input pattern in step 860, and moves the output object in a direction corresponding to the rotation direction of the finger in step 870. For example, when the portable terminal determines the touch input pattern of the user using the left hand, it determines that the user may rotate the finger to the right and downward from the left, and the portable terminal may move an output image when it senses the rotation of the finger that moves to the right and downward from the left.

Figure 9:
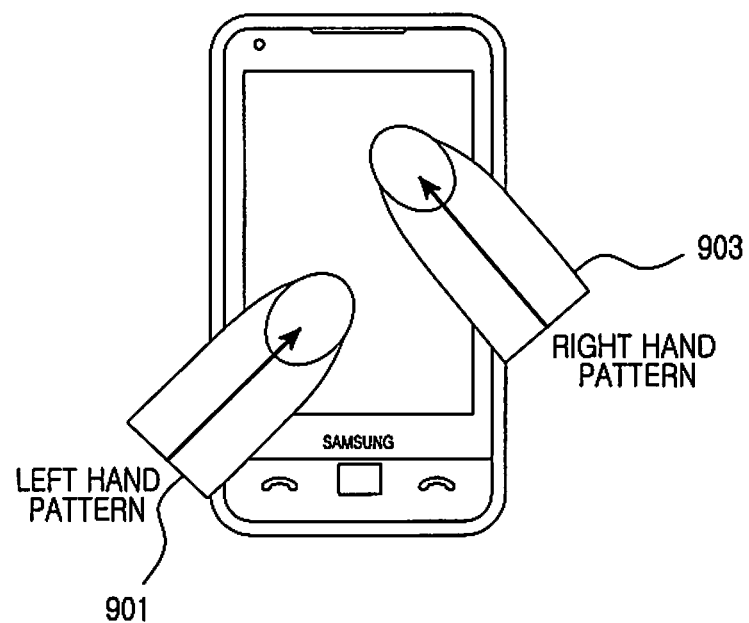
FIG. 9 is a diagram illustrating a method for determining a touch input pattern of a user in a portable terminal according to an embodiment of the present invention.

FIG. 9 is a diagram illustrating a method for determining a touch input pattern of a user in a portable terminal according to an embodiment of the present invention.

When the user of the portable terminal performs a touch input with the thumb of the left hand in step 901, the thumb of the left hand covers a portion of light receiving sensors. Therefore, the portable terminal receives sensed values from all light receiving sensors other than a light receiving sensor covered by the thumb of the left hand and determines that the user intends to perform the touch input with the left hand. However, when the user of the portable terminal performs a touch input with the thumb of the right hand in step 903, the thumb of the right hand covers a portion of light receiving sensors. Therefore, the portable terminal receives sensed values from all light receiving sensors other than a light receiving sensor covered by the thumb of the right hand and determines that the user intends to perform the touch input with the right hand.

Figure 10A:
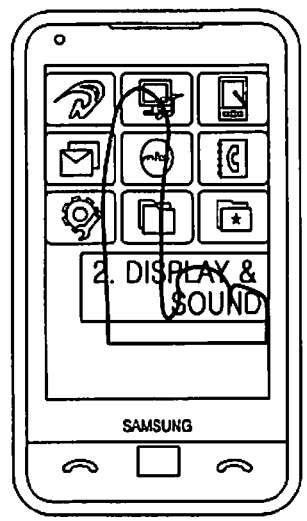
FIG. 10A is a diagram illustrating a data output screen based on a touch input of a user in a conventional portable terminal.
Figure 10B:
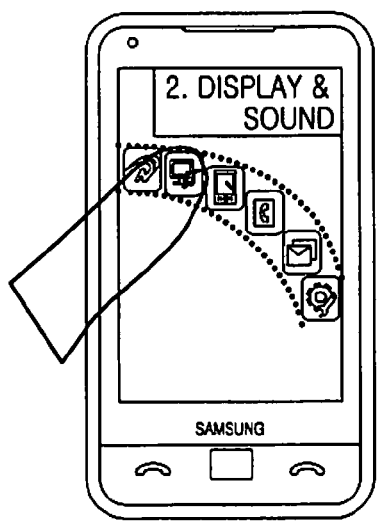
FIG. 10B is a diagram illustrating a data output screen based on a touch input of a user in a portable terminal according to an embodiment of the present invention.
Figure 10C:
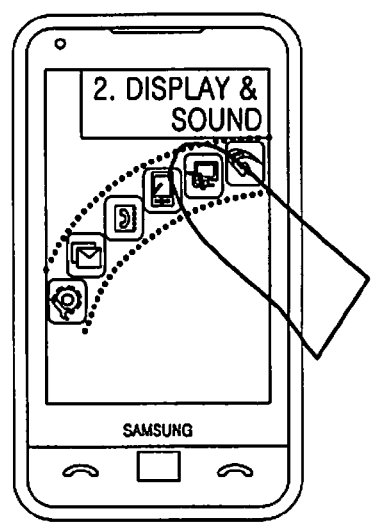
FIG. 10C is a diagram illustrating a data output screen based on a touch input of a user in a portable terminal according to an embodiment of the present invention.

FIGS. 10A-10C are diagrams illustrating a method for outputting data based on a touch input of a user in a portable terminal according to an embodiment of the present invention. Specifically, FIG. 10A is a diagram illustrating a data output screen based on a touch input of a user in a conventional portable terminal, FIG. 10B is a diagram illustrating a data output screen based on a touch input of a user in a portable terminal according to an embodiment of the present invention, and FIG. 10C is a diagram illustrating a data output screen based on a touch input of a user in a portable terminal according to an embodiment of the present invention.

Referring to FIG. 10A, the conventional portable terminal aligns and outputs icons having a certain size on the display unit 114. Consequently, a plurality of icons are blocked from a user's sight by their finger when entering a touch input. That is, because the conventional portable terminal outputs only fixed icons, it is difficult for the user to identify an icon covered by a finger for a touch input.

Referring to FIG. 10B, as described above, the portable terminal determines the input pattern of a user with the sensed value of a light receiving sensor, and when the user intends to perform a touch input using the left hand, the portable terminal determines an blocked region that may be generated by the finger of the left hand and outputs data to a visible region outside the blocked region. Accordingly, the portable terminal may output the data to a position (a rotation radius where the finger may move while the user is grasping the portable terminal) corresponding to the rotation radius of the finger of the left hand.

Referring to FIG. 10C, when the user intends to perform a touch input using the right hand, the portable terminal determines a blocked region that may be generated by the finger of the right hand and outputs data to a visible region outside the blocked region. Accordingly, the portable terminal may output the data to a position corresponding to the rotation radius of the finger of the right hand.

Figure 11A:
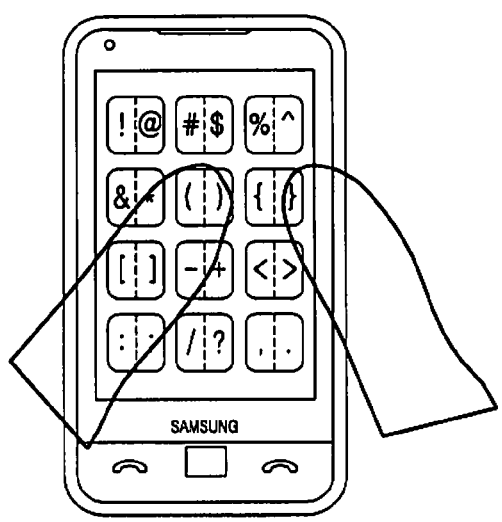
FIG. 11A is a diagram illustrating a special character data input screen based on a touch input of a user in a portable terminal according to an embodiment of the present invention.
Figure 11B:
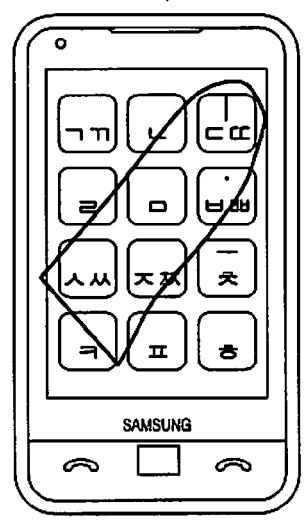
FIG. 11B is a diagram illustrating a character data input screen based on a touch input of a user in a portable terminal according to an embodiment of the present invention.
Figure 11C:
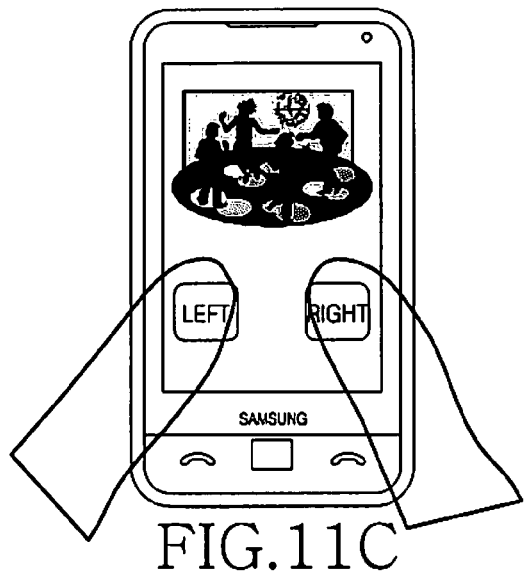
FIG. 11C is a diagram illustrating a character data input screen based on a touch input of a user in a portable terminal according to an embodiment of the present invention.

FIGS. 11A-11C are diagrams illustrating a data processing screen based on a touch input of a user in a portable terminal according to an embodiment of the present invention. Specifically, FIG. 11A is a diagram illustrating a special character data input screen based on a touch input of a user in a portable terminal according to an embodiment of the present invention, FIG. 11B is a diagram illustrating a character data input screen based on a touch input of a user in a portable terminal according to an embodiment of the present invention, and FIG. 11C is a diagram illustrating a character data input screen based on a touch input of a user in a portable terminal according to an embodiment of the present invention.

Referring to FIG. 11A, the portable terminal enables the input of two special characters with one character input button. For example, when '(' is marked on the left of one character input button and ')' is marked on the right of one character input button, a user may select '('or')' according to an input pattern. More specifically, when the portable terminal determines that the user performs a touch input using the left hand to touch the button on which '('and')' are marked, it outputs '(' on the display, and when the portable terminal determines that the user performs a touch input using the right hand, it outputs ')' on the display.

Referring to FIG. 11B, the portable terminal enables the input of two special characters, e.g., Korean characters, with one character input button. For example, a basic consonant is marked on the left of one character input button and a complex consonant is marked on the right of one character input button, and thus a user may select the basic consonant or the complex consonant according to an input pattern.

More specifically, the portable terminal measures the sensed value of a light receiving sensor and determines the touch input pattern of the user such as a left-hand direction, a right-hand direction, and a finger direction, and performs a character input based on the pattern of the user. For example, when the user selects a button where a basic consonant 'ㄷ' is marked on the left of one character input button and a complex consonant 'ㄸ' is marked on the right of the one character input button, the portable terminal allows 'ㄷ' to be input when the left-handed touch input pattern of the user is determined, or the portable terminal allows 'ㄸ' to be input when the right-handed touch input pattern of the user is determined.

Referring to FIG. 11C, the portable terminal measures the sensed value of a light receiving sensor and determines the touch input pattern of the user such as a left-hand direction, a right-hand direction and a finger direction, and it controls a game function according to the pattern of the user. For example, when the portable terminal determines the left-hand touch input pattern of the user, it moves a game character to the left, and when the portable terminal determines the right-hand touch input pattern of the user, it moves a game character to the right.

Figure 12A:
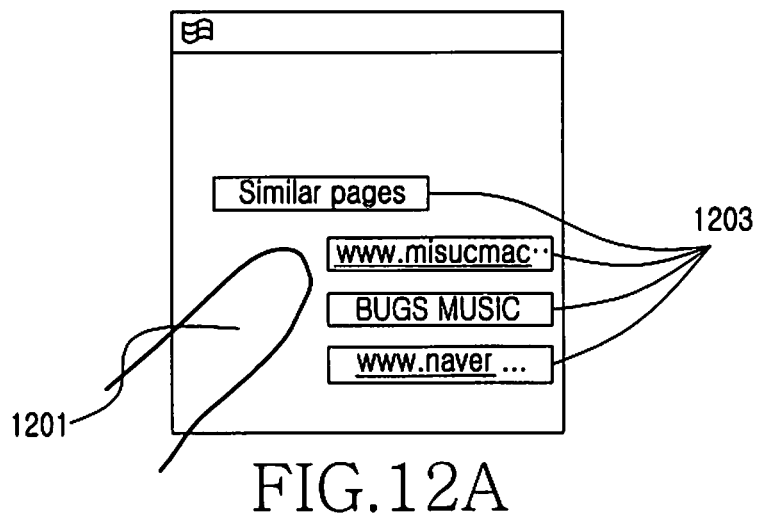
FIG. 12A is a diagram illustrating a screen outputting a link address overlapped in a blocked region to a visible region and a screen outputting a content window of a point corresponding to a touch input of a user to the visible region, in a portable terminal according to an embodiment of the present invention.
Figure 12B:
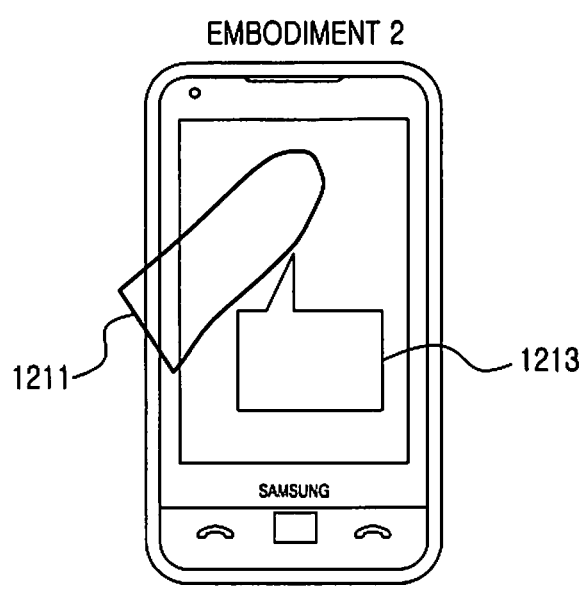
FIG. 12B is a diagram illustrating a screen outputting a content window of a point corresponding to a touch input of a user to a visible region, in a portable terminal according to an embodiment of the present invention.
Figure 12C:
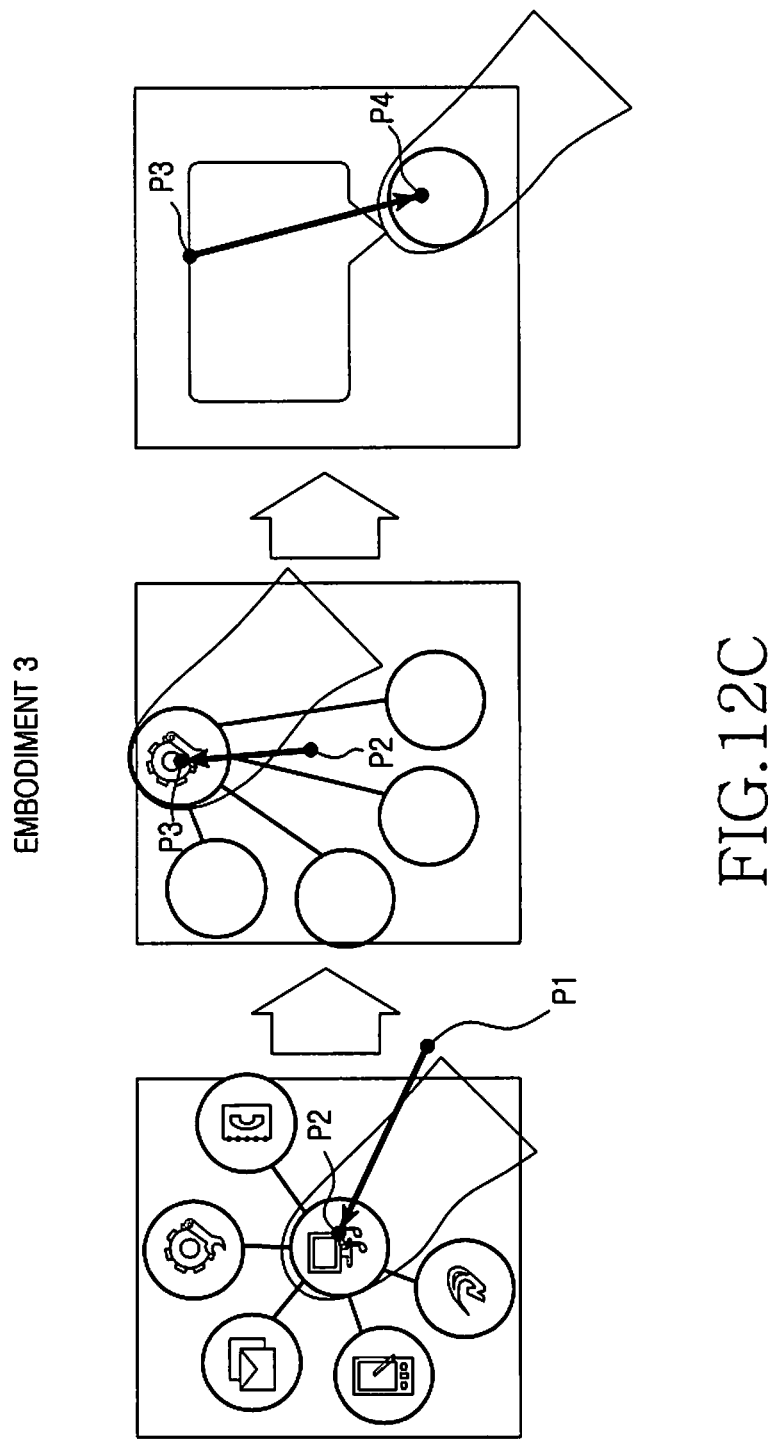
FIG. 12C is a diagram illustrating a screen outputting a lower menu by menu selection of a user to a visible region in a portable terminal according to an embodiment of the present invention.

FIGS. 12A-12C are diagrams illustrating a data output screen based on an input pattern of a user in a portable terminal according to an embodiment of the present invention.

FIG. 12A is a diagram illustrating a screen that outputs a link address overlapped in a blocked region to a visible region, in a portable terminal, FIG. 12B is a diagram illustrating a screen that outputs a content window of a point corresponding to a touch input of a user to the visible region, in a portable terminal, and FIG. 12C is a diagram illustrating a screen that outputs a lower menu by menu selection of a user to a visible region in a portable terminal.

Referring to FIG. 12A, when the portable terminal intends to output a link address overlapped in a blocked region to a visible region, it measures the sensed value of a light receiving sensor and determines the blocked region that may be generated by the finger of a user, and determines an overlapped link that may be included in the area 1201 of the blocked region. Subsequently, the portable terminal determines that the overlapped link of the blocked region may be covered by the finger of the user and moves the link to the visible region 1203.

Referring to FIG. 12B, when the portable terminal intends to output a content window using a point corresponding to the touch input of the user to the visible region, the portable terminal arranges a content window, which includes information on a point 1211 corresponding to the touch input of the user, in a visible region that is not covered by the finger of the user in step 1213.

Referring to FIG. 12C, when the portable terminal intends to output a lower menu by the menu selection of a user to a visible region, it outputs lower menus, which may be output according to already-output menu selection, to a visible region outside of the blocked region.

For example, it is assumed that the portable terminal has output a multimedia menu and lower menus based on it. When the user selects any one from among the already-output lower menus, it outputs a lower menu of a menu selected by the user to a visible region outside of the blocked region. Herein, the portable terminal allows one menu selected by the user to be output to the visible region through a content window. An arrow indicates that the user performs touch movement from a point P1 to a point P4 through a touch moving path, and it can be seen that the portable terminal prohibits a corresponding menu to be output to a blocked region when touch movement is performed.

Figures 13A, 13B:
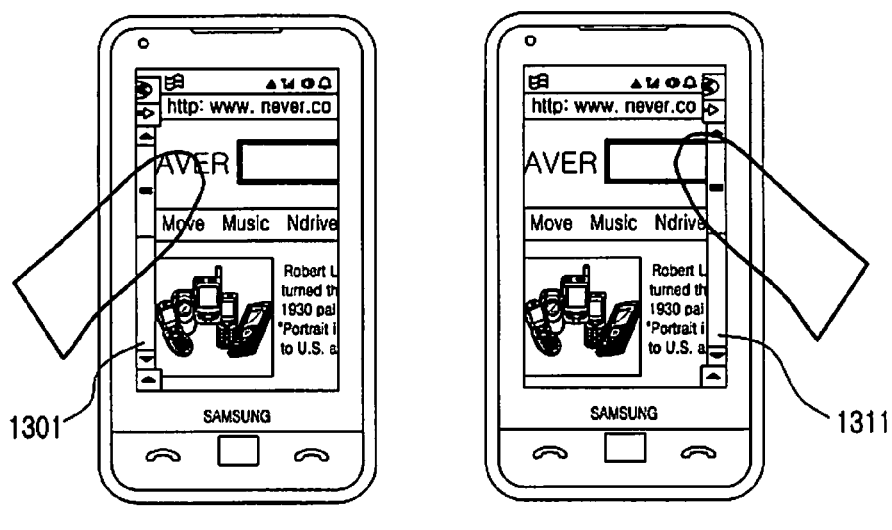
FIGS. 13A and 13B are diagrams illustrating a screen changing a position of a GUI based on an input pattern of a user in a portable terminal according to an embodiment of the present invention.

FIGS. 13A and 13B are diagrams illustrating a screen that changes a position of a GUI based on an input pattern of a user in a portable terminal according to an embodiment of the present invention.

Referring to FIGS. 13A and 13B, the portable terminal drives light receiving sensors for sensing light and determines the pattern of a touch input that is performed by the user. That is, the portable terminal drives light receiving sensors to sense light. However, since a light receiving sensor covered by a finger in the touch input of a user cannot sense light, the portable terminal may determine the touch input pattern of the user using the measured value of the light receiving sensor.

As described above, the position of a scroll bar may be switched to a position corresponding to the touch input pattern of the user of the portable terminal that has determined the touch input pattern of the user. For example, when the user of the portable terminal performs a touch input using the left hand of the user, as illustrated in FIG. 13A, the portable terminal may switch the position of the scroll bar to the left of an output page 1301 in order for the user already performing an input to easily manipulate the scroll bar with the finger of the left hand. Similarly, when the user of the portable terminal performs a touch input using the right hand of the user, as illustrated in FIG. 13B, the portable terminal may switch the position of the scroll bar to the right of the output page 1311 in order for the user already performing an input to easily manipulate the scroll bar with the finger of the right hand.

As described above, the portable terminal according to embodiments of the present invention determines the input pattern of a user to enable dynamic GUI arrangement, and thus by rearranging the icons from a blocked region to a visible region, the portable terminal simplifies the character input operation of the user and enables the input of different characters based on the input pattern of the user.

Although the present invention has been shown and described with reference to certain embodiments thereof, it will be understood by those skilled in the art that various changes in form and details may be made therein without departing from the spirit and scope of the present invention as defined by the appended claims.

What is claimed is:

1. An apparatus for displaying objects in a portable terminal, the apparatus comprising:
   a display unit for displaying at least one object;
   a sensing unit for measuring an amount of light on the display screen; and
   a control unit for:
      arranging a plurality of objects on the display unit;
      determining a blocked region and a visible region on the display unit based on the amount of light on the display unit, and
      rearranging at least one of the plurality of objects in the visible region of the display unit,
   wherein the control unit determines a region that light is blocked on the display unit as the blocked region, and determines another region as the visible region, and
   wherein the sensing unit comprises a plurality of sensors separated from and surrounding the display unit.

2. The apparatus of claim 1, wherein the control unit determines at least one of a finger position of the user, and a finger rotation direction of the user on the display unit based on the amount of light on the display unit.

3. The apparatus of claim 1, wherein the control unit is further configured to input different characters on a same key, rearrange elements of a Graphical User Interface (GUI) from the blocked region into the visible region, and reset the GUI within a finger moving range of the user.

4. The apparatus of claim 3, wherein the blocked region represents a region that is covered by a finger of the user on the display unit, identifies a GUI that is normally displayed in the blocked region, and rearranges the identified GUI to the visible region.

5. The apparatus of claim 4, wherein the control unit arranges lower menus by menu selection of the user in the visible region.

6. The apparatus of claim 3, wherein the control unit determines the blocked region and the visible region according to finger movement of the user.

7. The apparatus of claim 3, wherein the control unit changes a position of a scroll bar according to a direction corresponding to the hand of the user and rearranges the GUI of the blocked region into the visible region.

8. A method for displaying objects in a portable terminal, the method comprising:
   arranging a plurality of objects in a display unit;
   determining a blocked region and a visible region on the display unit based on an amount of light on the display unit; and
   rearranging at least one of the plurality of objects in the visible region of the display unit,
   wherein determining the blocked region and the visible region comprises determining a region that light is blocked on the display unit as the blocked region, and determining another region as the visible region, and
   wherein the amount of light is measured by a sensing unit comprising a plurality of sensors separated from and surrounding the display unit.

9. The method of claim 8, further comprising determining at least one of a finger position of the user and a finger rotation direction of the user on the display unit based on the amount of light on the display unit.

10. The method of claim 8, further comprising at least one of inputting different characters on a same key, rearranging elements of a Graphical User Interface (GUI) from the blocked region into the visible region, and resetting the GUI within a finger moving range of the user.

11. The method of claim 10, wherein rearranging the elements of the GUI comprises:
   determining a GUI that is normally displayed in the blocked region; and
   rearranging the determined GUI from the blocked region into the visible region.

12. The method of claim 11, wherein the blocked region and the visible region change according to finger movement of the user.

13. The method of claim 11, further comprising arranging lower menus by menu selection of the user in the visible region.

14. The method of claim 10, wherein rearranging the elements of the GUI comprises an operation changing a position of a scroll bar according to a direction corresponding to the hand of the user determined to have performed the touch input.

* * * * *